United States Patent
De Bruine

(10) Patent No.: US 10,704,588 B2
(45) Date of Patent: Jul. 7, 2020

(54) THREADED METALLIC FASTENER AND PROCESS FOR COATING A THREADED METALLIC FASTENER

(71) Applicant: Lubo Global Innovation B.V., Kortgene (NL)

(72) Inventor: Pieter Isaac De Bruine, Kortgene (NL)

(73) Assignee: LUBO GLOBAL INNOVATION B.V., Kortgene (NL)

(*) Notice: Subject to any disclaimer, the term of this patent is extended or adjusted under 35 U.S.C. 154(b) by 64 days.

(21) Appl. No.: 15/572,222

(22) PCT Filed: May 12, 2016

(86) PCT No.: PCT/NL2016/050338
§ 371 (c)(1),
(2) Date: Nov. 7, 2017

(87) PCT Pub. No.: WO2016/182443
PCT Pub. Date: Nov. 17, 2016

(65) Prior Publication Data
US 2018/0128302 A1  May 10, 2018

(30) Foreign Application Priority Data
May 12, 2015 (NL) .................................. 2014798

(51) Int. Cl.
| | |
|---|---|
| *F16B 33/06* | (2006.01) |
| *C10M 101/02* | (2006.01) |
| *C10M 169/04* | (2006.01) |
| *C10M 125/02* | (2006.01) |
| *C10M 125/26* | (2006.01) |
| *C10M 159/02* | (2006.01) |
| *C25D 7/00* | (2006.01) |

(52) U.S. Cl.
CPC ......... *F16B 33/06* (2013.01); *C10M 101/025* (2013.01); *C10M 125/02* (2013.01); *C10M 125/26* (2013.01); *C10M 159/02* (2013.01); *C10M 169/044* (2013.01); *C25D 7/003* (2013.01); *C10M 2201/041* (2013.01); *C10M 2201/105* (2013.01); *C10M 2203/104* (2013.01); *C10M 2205/14* (2013.01); *C10M 2205/163* (2013.01); *C10M 2207/20* (2013.01); *C10M 2207/283* (2013.01); *C10N 2230/02* (2013.01); *C10N 2230/06* (2013.01); *C10N 2230/62* (2013.01); *C10N 2240/06* (2013.01); *C10N 2250/08* (2013.01); *C10N 2250/121* (2013.01); *C10N 2280/00* (2013.01)

(58) Field of Classification Search
CPC ............................ F16B 33/06; C10M 101/025
See application file for complete search history.

(56) References Cited

U.S. PATENT DOCUMENTS

| | | | | |
|---|---|---|---|---|
| 3,856,686 A | * | 12/1974 | Sato ..................... | C10M 177/00 508/112 |
| 2002/0137637 A1 | * | 9/2002 | Wojtecki .............. | C10M 169/00 508/161 |
| 2003/0119681 A1 | * | 6/2003 | Patel .................... | C10M 169/00 508/150 |

FOREIGN PATENT DOCUMENTS

| | | |
|---|---|---|
| CN | 101151486 A | 3/2008 |
| CN | 103282707 A | 9/2013 |
| CN | 104520414 A | 4/2015 |
| EA | 017538 B1 | 10/2010 |
| EP | 2210931 A1 | 7/2010 |
| WO | 94/03561 A1 | 2/1994 |
| WO | 2006/104251 A1 | 10/2006 |
| WO | 2014/095817 A1 | 6/2014 |

OTHER PUBLICATIONS

Indian Office Action for Indian Application No. 201727041033 dated Feb. 24, 2020.

* cited by examiner

*Primary Examiner* — Alex A Rolland
(74) *Attorney, Agent, or Firm* — Hoffmann & Baron, LLP

(57) ABSTRACT

A metallic fastener has a threaded portion coated with a composition. The composition includes (a) a paraffin wax with a melting temperature in the range of 50 to 70° C. (b) 1 to 5 parts by weight (pbw) of a resin per pbw of paraffin wax, (c) 0.1 to 0.25 pbw graphite per pbw of paraffin wax, and (d) 0.05 to 0.30 pbw of an FDA-approved silica per pbw of paraffin wax. A process for coating the metallic fastener includes: (i) providing the composition as defined above, (ii) maintaining the fastener or bringing it to a temperature in the range of 30 to 70° C., (iii) applying the composition at a temperature in the range of 100 to 170° C., (iv) optionally, removing surplus composition, (v) cooling the fastener to less than 100° C., (vi) finishing the fastener in a water bath, and (vii) drying the fastener.

16 Claims, No Drawings

THREADED METALLIC FASTENER AND PROCESS FOR COATING A THREADED METALLIC FASTENER

CROSS-REFERENCE TO RELATED APPLICATIONS

This application is the National Stage of International Application No. PCT/NL2016/050338 filed May 12, 2016, which claims the benefit of Netherlands Application No. NL 2014798, filed May 12, 2015, the contents of which is incorporated by reference herein.

TECHNICAL FIELD

The present invention relates threaded metallic fasteners, such as studs, screws, bolts and nuts. More in particular, it relates to a process for coating a threaded fastener and as well as the coated fastener.

STATE OF THE ART

From EP2210931 a lubricating coating composition is known for application on the threaded joint of steel pipes for use in connecting steel pipes and particularly oil country tubular goods. This composition is based on a rosin and/or calcium fluoride, metal soap; wax; a basic metal salt of an aromatic organic acid, and graphite as lubricating powder. The thickness of the lubricating coating is preferably 10-500 µm, which is relatively thick. The lubricating coating according to EP2210931 is in the form of a viscous liquid or a semisolid (cf. page 13, [0106]). This coating composition is not suitable for fasteners, as it will quickly wear off and cause staining.

A fastener is a device that mechanically, temporarily joins or affixes two or more objects together. A threaded fastener is a fastener which comprises a threaded portion. Examples include (hydraulic) screws, bolts and nuts. They are typically made from metal, in particular from stainless steel. The expression "fastener" as used in the current application is meant to be a device as defined above, made of metal that comprises a threaded portion.

"Thread seizing" is a common problem to stainless steel and other alloy fasteners. It can be regarded as a process of cold welding. During fastener tightening, the high speed and suddenly high temperature may cause the galling of threads and lead to seizing—the actual freezing together of the threads. The easiest and most effective solution is lubrication. Lubricants have been used for decades as pre-lubrication coatings on stainless steel and other alloy fasteners to minimize the risk of thread seizing. Lubricants once properly applied, form colourless, touch-proof, and ultra-thin lubricating films which can effectively improve the problems of "thread galling" and "cold welding" during tightening. Coated fasteners such as lubricated bolts and the like are known. At the Fastener Fair in Hannover 2014 Lubo technics presented a coated bolt which because of its composition, is FDA compliant and very environmental friendly. As various video presentations on the internet shows, the coating is very successful in avoiding seizing, even if the threaded portion of a bolt is severely damaged. The nature of said composition has been kept confidential.

Despite the successful introduction of this coating, the need remains to further improve this composition. Thus, it is important that the coating does not stick or wear off. This is the more important as the applied coating must be thin. As is known, the margin for tolerance in screws and bolts and similar fasteners is very small. For an M1,6 type fastener, the coating should preferably be about 4 µm thick or less; for an M68 type fastener, the coating may be about 20 µm thick or less. The coating should therefore be ultra-thin, smooth and uniformly applied. Moreover, the composition should be such as to allow the most effective application, for instance immediately after the fastener has been made. In this regard it is to be noted that in typical productions process, involving a casting process, a thread making process (e.g., rolling, machining, finishing) and/or a welding process if heads are welded to threads to form a bolt, or the like, elevated temperatures are used, and/or the temperature of the fastener has increased due to the manner by which the threading is formed. In other words, it is highly desired to have a coating composition that meets the requirements of being FDA compliant and environmental friendly, successfully prevent thread galling and cold-welding, can be applied to result in a thin, touch-proof smooth film extending the entire threaded portion is so desired of the fastener, and can be applied efficiently, even at elevated temperatures, without being sticky at room temperature or wearing off.

A need therefore exists for an improved coating composition

SUMMARY OF THE INVENTION

Accordingly, the present invention provides a metallic fastener comprising a threaded portion, wherein at least part of the threaded portion is coated with a new hard, FDA-approved composition which essentially consists of
(a) a paraffin wax with a congealing point determined by ASTM method D938-71 (Reapproved 1981) in the range of 50 to 70° C.
(b) 1 to 5 parts by weight (pbw) of a resin per pbw of paraffin wax,
(c) 0.1 to 0.25 pbw graphite per pbw of paraffin wax, and
(d) 0.05 to 0.30 pbw of a silica per pbw of paraffin wax.

Moreover, the present invention provides a process for coating a metallic fastener comprising a threaded portion, comprising the following steps:
(i) Providing a composition as defined above,
(ii) Maintaining the fastener or bringing it to a temperature in the range of 30 to 70° C.,
(iii) Applying the composition at a temperature in the range of 100 to 170° C.,
(iv) optionally, removing surplus composition,
(v) cooling the fastener to less than 100° C.,
(vi) finishing the fastener in a water bath, and
(vii) drying the fastener.

Additionally, the present invention provides a process for powder coating a metallic fastener comprising a threaded portion, comprising the following steps:
(i) Providing a composition as defined above,
(ii) producing a powder of said composition,
(iii) Electrodepositing the powdered composition to form a coating on the threaded parts of the metallic fastener
(iv) optionally, removing surplus composition,
(v) melt-fusing the applied powdered composition at a temperature in the range of 100 to 200° C., and
(vi) cooling the fastener.

DETAILED DESCRIPTION OF THE INVENTION

Importantly, the composition of the present invention is based solely on FDA-approved components (i.e., components that in the amount used meet the requirements of the U.S. Food and Drug Administration as set in 2015). The composition is preferably water-free. The presence of water or other components with a boiling point of 100° C. or below would cause problems when the composition is brought to elevated temperatures. Moreover, the presence of water may adversely affect the metallic fastener. The expression "essentially consists of" is used herein to indicate that minor amounts of other FDA-compliant components may be present, e.g., up to 5% on the total weight of the composition, provided these other components do not interfere with components (a) to (d).

The coating should be hard and touch-proof. Preferably it has a melting point as determined by DSC (ASTM D3418) of at least 70° C. preferably at least 100° C. For application as powder coating, the melting point is preferably at least 100° C. Generally, the melting point is less than 170° C., preferably less than 160° C. For application onto the fastener as a melt, the melting point is preferably less than 130° C. The minimum temperature ensures that the coating, despite being ultra-thin, remains on the threaded parts of the metallic fasteners even when used at tropical conditions. The maximum temperature ensures that the coating does not become too brittle and breaks off when the fasteners are put together in a box.

Moreover, the coating should be able to perform whilst being applied as an ultra-thin layer, e.g. with a thickness in the range of 4 to 30 µm, preferably in the range of 5 to 20 µm.

Component (a)

Paraffins or paraffin hydrocarbons, are saturated hydrocarbons having the general formula $C_nH_{n+2}$, wherein n is at least 15. Paraffin wax has a congealing point as determined by ASTM method D938-71 (Reapproved 1981) within the range of about 50 to about 70° C., although this can vary, according to such factors as oil content and crystalline structure. The selection of the paraffin wax, by way of its congealing point, is important. When employing a paraffin wax with a congealing point below 50° C., the coating may be sticky and wear off. Also, when applying on fasteners at elevated temperature, the composition may be too fluid for appropriate application over the threaded portion of the fastener. This may be compensated by the other components of the composition, but with different disadvantages as a result. When employing a paraffin wax with a congealing point above 70° C., the coating may become too brittle and chip off during the production or after manufacture. Paraffins are commercially available. In addition to pure paraffin wax, based on n-alkanes, also modified paraffin waxes may be used that contain branched alkanes and other components influencing their crystallinity, provided they are FDA-approved. FDA approval refers to an oil content, which should be less than 2.5% as determined by ASTM method D721-56T, and absorptivity. For FDA approval, the substance has an absorptivity at 290 millimicrons in decahydronaphthalene at 88° C. not exceeding 0.01 as determined by ASTM method E131-81a, "Standard Definitions of Terms and Symbols Relating to Molecular-Spectroscopy." Other waxes, like e.g. beeswax may be used, but are not preferred for cost reasons.

Component (b)

The resin of choice is FDA-approved. The U.S. Food and Drug Administration maintains various lists of additives that are allowed. Reference is made to Code of Federal Regulations Title 21, of Apr. 1, 2015. Moreover, it is not a hazardous substance or mixture according to Regulation (EC) No. 1272/2008 or according to EC-directives 67/548/EEC or 1999/45/EC. Advantageously the resin and the paraffin wax mix well so as to form a homogeneous composition. Suitable resins include rosin, glycerine rosin ester, synthetic polyterpene resin, $C_9$-aromatic hydrocarbon resin, $C_5$-aliphatic hydrocarbon resin, mixed $C_9$-aromatic/$C_5$-aliphatic resin and mixtures thereof.

The resin has an adhesive function. It promotes the adhesion of the composition to the threaded portion of the fastener. The selected resins also have a synergistic effect on the melting temperature of the selected paraffin wax, which allows the use of low melting paraffin waxes that can be applied as relatively thin coating around the threaded portions of a fastener, without risk of being sticky after manufacture at ambient temperature. The combination of paraffin wax and resin provides for a sufficient hydrophobic performance. The paraffin wax and resin are excellently mixable when the resin is rosin (e.g., colophony). Therefore, the resin consists advantageously of colophony. For application as powder coating other rosins like damar resin (a hard natural resin that comes from a family of deciduous trees that grow in the East Indies) has been found very suitable. Damar resin has been found very suitable for hardening and for raising the melting temperature of the coating composition.

Using less than 1 pbw of resin does not achieve the desired result of adhesion and synergistic effect on the paraffin wax. Using more than 5 pbw of resin adversely affects the application behaviour at elevated temperature, and may cause the coating to become brittle.

Advantageously, the amount of resin and paraffin wax are selected such that the composition has a dynamic viscosity such that at 50° C. its value is at least 1.0 Pa·s (measured as described in the Example). This may be achieved by selecting the proper paraffin wax, resin and thixotropic agent (as defined hereafter) and their relative amounts.

Component (c)

The composition on the fastener according to the invention comprise graphite. The graphite may be natural or synthetic. Natural graphite is mined and may contain some impurities, such as sulphur compounds or silica. Synthetic graphite is obtained from the sintering of carbon. It typically has a high purity, and at high carbon content the lubricating performance enhances. Either may be used, provided that the graphite is of high purity and thus FDA approved. The graphite acts as a solid lubricant in the composition. It may be replaced, in part, by other known solid lubricants. Solid lubricants include molybdenum disulphide, tungsten disulphide, graphite, boron nitride, antimony oxide, lead oxide, calcium fluoride, cerium fluoride, talc and mixtures thereof, some (grades) of which are FDA approved, and some of which are not. In the present invention only FDA approved solid lubricants should be used. Use of graphite as the sole solid lubricant is preferred, since graphite may be used in all types of industry, including the food industry.

The amount of graphite may vary within the defined range. Using less may adversely affect the counter-galling property of the coating. If too much graphite is used, the application and adhesive properties may be adversely affected.

Component (d)

A further essential component is silica, which influences the hardness of the coating and also acts as a thixotropic agent. The more preferred thixotropic agent is precipitated or fumed silica, the latter being especially preferred. Fumed silica has a very strong thickening effect. It consists of very small silica particles with an average particle size of 5 to 50 nm. It is inter alia sold under the trade names Aerosil and Cab-O-Sil.

As indicated above, the presence of silica promotes the hard, solid nature of the composition when the composition has been applied to the fastener. The hard, solid nature of the coating is important, to ensure that the coating remains on the fastener without wearing off, or breaking off. Staining (as may happen when grease or lubricating oil is used) is definitely to be avoided. Moreover, silica ensures that the viscosity of the composition decreases when the composition is subjected to movement. It may be replaced, in part, by other known thixotropic agents. Several thixotropic agents are known in the art. Organic thixotropic agents include castor wax, amide wax, oxidized polyethylene wax, polymerized vegetable oil and mixtures thereof. Inorganic thixotropic agent include attapulgite, montmorillonite, hectorite, bentonite and mixtures thereof.

If less than 0.05 pbw silica is used, then the coating may be too soft and viscous. If more than 0.30 pbw silica is used, then the coating may become brittle. Preferred amounts of silica are in the range of 0.08 pbw to 0.25 pbw. For application by powder coating, amounts of silica in excess of 0.08 pbw are preferred.

PREFERRED EMBODIMENT

The composition essentially consists of a paraffin wax, a resin, graphite (or similar solid lubricant) and silica (or similar thixotropic agent) as defined above. The composition may contain other components, like colouring agents and the like, but preferably consist of these four components. When the composition consists of paraffin, graphite, colophony or damar and fumed silica it has the further advantage that the composition is suitable for use in the food industry.

The relative amounts of these components may vary within the ranges described. Preferably, for melt application the relative amounts in the composition are 1.5 to 3 pbw of resin per pbw of paraffin wax, and 0.12 to 0.20 pbw of graphite per pbw of paraffin, and 0.06 to 0.10 pbw of silica per pbw of paraffin. For application as powder coating, the amount of silica may be slightly higher, e.g., in the range of 0.08 to 0.25 pbw. The composition accordingly will have a melting point in greater than 70, preferably greater than 100° C., but less than 170, preferably less than 160° C. (determined by DSC, ASTM D3418). In this way, the application of the composition to the fastener can be accomplished without undue difficulties, whereas at ambient temperatures the composition is sufficiently solid to avoid stickiness and fluidity of the composition, so that the fasteners do not stick together and do not lose the coating.

The Metallic Fastener

The metallic fastener according to the present invention may be selected from a variety of fastening means. They include a screw, a bolt and a nut. By these phrases, all types of screws and bolts are understood, including tapping screws, key bolts, wedge bolts cotter bolts etc. the only prerequisite of such fastening means is that it contains a thread. The fastener may be made of stainless steel or an alloy. The invention is in particular suitable for metallic fasteners that suffer from galling and/or cold welding.

The Composition

The present invention also provides the composition with which the fastener may be at least partly coated. The composition is new. Accordingly, the present invention also provides a coating composition for threads, consisting essentially of the components (a) to (d) defined above. The fastener according to the invention may be coated partly or wholly by the present composition. Such may be dependent on the process for preparing such fastener.

The Process for Coating a Threaded Metallic Fastener

Moreover, the present invention provides a process for coating a metallic fastener comprising a threaded portion, comprising the following steps:
(i) providing a composition as defined above,
(ii) Maintaining the fastener or bringing it to a temperature in the range of 30 to 70° C.,
(iii) Applying the composition at a temperature in the range of 100 to 170° C.,
(iv) optionally, removing surplus composition,
(v) cooling the fastener to less than 100° C.,
(vi) finishing the fastener in a water bath, and
(vii) drying the fastener.

The heated composition, at a temperature in the range of 100 to 170° C., is applied to at least part of threaded portion of the fastener. This may be done for instance by spraying or dipping. Advantageously, this is done at the site where the fastener is made, as part of the manufacturing process of the fastener. When this is done as part of the manufacturing process, this has the advantage that cold welding when fasteners are boxed before sending to distributors and (re)sellers is avoided.

The spraying or dipping may be carried out such that the entire fastener is exposed to the coating composition. However, the application may also be conducted to only the fastener' threaded portion or a part thereof.

When the heated liquid composition contacts the fastener, the composition might be quenched if the fastener is relatively cold. This may incur relatively thick layers of coating compositions. In order to avoid the potential occurrence of such thick coating layers, the fastener, or at least the threaded portions thereof are heated before they are exposed to the heated liquid composition. According to the process of the invention, the fastener is maintained or brought to a temperature that is in the range of 30 to 70° C. If the melting temperature of the composition is high, then the heated fastener may have a correspondingly higher temperature. The composition of the present invention is suitably heated to a temperature above that of the fastener, preferably from 130 to 150° C.

Surplus composition is preferably removed, for instance by blowing off said surplus. Next, the coated fastener is allowed to cool down. Preferably it is cooled down to between 60 and 75° C. before it is finished in a water bath. When cooling to less than 60° C., the coating may become gritty and less smooth. When the fastener is cooled to temperatures in excess of 75° C., the difference in temperature between the water bath and the fastener may cause the coating to chip and separate from the fastener. Preferably, the temperature of the water bath is between 30 and 50° C., more preferably between 35 and 40° C. If the water temperature is below 30° C. then this coating composition cools down too fast and the coating may become gritty and less smooth. If the temperature is more than 50° C., then the fasteners may stick to each other and the coating may be damaged when fasteners are separated further on in the process. In the water bath the fasteners are typically finished by brushing. Finally, water is removed, preferably by blowing off. Equivalent process steps may be taken at each step to achieve the same goal.

The coating may also effectively be applied as powder coating. Similar to the method described above, first a composition is made by heating the components at elevated temperature and forming a homogeneous composition. The composition is then cooled whereby it becomes solid. The solid composition is milled and sieved to form a powder suitable for powder coating. The average particle diameter of the powder coating is preferably in the range of 0.05-30 µm and more preferably in the range of 0.07-20 µm.

A solid coating composition can be applied using conventional powder coating techniques by depositing the composition in powder form on a heated fastener and allowing the composition to melt, if necessary with heating. Alternatively, the powder is applied first and then heated to melt. The application is preferably with an electrostatic gun, which imparts a positive electric charge to the powder, whereas the fastener is grounded. Upon cooling, a lubricating coating is formed. Ideally, the powder is applied only on the threaded parts of the fastener. Unthreaded parts are either not coated at all, or the powder is removed before it melts.

The invention will be further elucidated by means of the following examples.

Example 1

A composition was prepared comprising 100 gr. of paraffin wax (Product code. 14759, supplied by Brenntag NV, congealing point of 53° C.), 8 gr. of fumed silica, sold under the trade mark Aerosil® 200 by Evonik industries, 16 gr. graphite powder and 200 gr. Colophony WW (product code 11716, supplied by Brenntag), by mixing the components at a temperature of about 100° C. After cooling, the viscosity behaviour of the cooled composition was determined, using a rheometer AR 200 EX, i.e. a parallel plate rheometer, measuring the torque and the angular velocity. A graph of shear stress (torque) against shear rate (angular velocity) yields the viscosity in a straightforward manner.

The actual measurements were conducted by means of said rheometer using a 25 mm diameter plate-plate configuration and a gap of 1000 µm. Gap offset was 0 µm. A torsion oven was used as temperature controller. The dynamic viscosity was determined at a shear rate in the range of 0.01 up to 100 s$^{-1}$ using steady state flow as ramp type. The shear rate factor was 12.50. Before measurement a sample was conditioned using an equilibrium time of 7 minutes. The results of the measurements at different temperatures are shown in the Table below.

TABLE

| Temperature, ° C. | Dynamic viscosity, Pa · s |
|---|---|
| 50 | 4.016 |
| 60 | 0.726 |
| 80 | 0.377 |
| 120 | 0.058 |

The results show that the composition is excellently fluid at a temperature in the range of above about 100° C., which makes it easy to apply. At the melting temperature of the paraffin wax, i.e. about 50° C., the composition is still very viscous, and at ambient temperature, the composition is hard, so that the composition when applied to the fastener, remains on the fastener. The coated fastener had excellent anti-galling properties, without being sticky. The melt temperature is slightly higher than 70° C.

Comparative Example 2

A comparative composition was made, wherein the relative amount of paraffin wax was doubled and as a consequence, the relative amounts of resin, lubricant and thixotropic agent were reduced to less than the limits of the claim. The composition was prepared comprising 200 gr. of the paraffin wax, 8 gr. of the fumed silica, 16 gr. graphite powder and 200 gr. of the colophony, by mixing the components at a temperature of about 100° C. Although the coated fastener performed reasonably well in terms of preventing galling and cold-welding, the coating was sticky, causing stains. Moreover, the coating was less uniform. A significant number of defects during the manufacture were found, which shows that this composition is less suitable in terms of its applicability.

Comparative Example 3

The composition was prepared comprising 500 gr. of the paraffin wax, 125 gr. graphite powder and 500 gr. of the colophony, by mixing the components at a temperature of about 100° C. The material is semi solid and not very hard. The material melts easily upon touch and behaves similar to chocolate and causes staining to hands and textile.

Example 4

A composition was prepared comprising 100 gr. of the paraffin wax, 14 gr. of the fumed silica, 16 gr. graphite powder, 24 gr. titanium dioxide and 200 gr. Damar C (CEROGA® supplied by Roeper GmbH), by mixing the components at a temperature of about 140° C. The composition was rolled flat, cooled and broken into small chips. The chips were milled and sieved to make a fine powder. The powder was applied using an electrostatic gun onto a fastener at ambient temperature by in a conventional manner. The fastener was then heated to melt the powder whereby the coating was formed. The coating composition had a melt temperature greater than 100° C., but less than 170° C.

The invention claimed is:

1. A metallic fastener comprising a threaded portion, wherein at least part of the threaded portion is coated with a composition which has a melting point as determined by DSC (ASTM D3418) of at least 70° C., and wherein the components and their amounts meet the requirements of the U.S. Food and Drug Administration as set in 2015 and which essentially consists of:
   (a) a paraffin wax with a congealing temperature as determined by ASTM method D938-71 (reapproved 1981) in the range of 50 to 70° C.,
   (b) 1 to 5 parts by weight (pbw) of a resin per weight of paraffin wax,
   (c) 0.1 to 0.25 pbw graphite being essentially elemental carbon per weight of paraffin wax, and
   (d) 0.05 to 0.30 pbw of an FDA-approved silica per pbw weight of paraffin wax.

2. The metallic fastener according to claim 1, wherein the resin is selected from the group consisting of rosin, glycerine rosin ester, synthetic polyterpene resin, $C_9$-aromatic hydrocarbon resin, $C_5$-aliphatic hydrocarbon resin, mixed $C_9$-aromatic/$C_5$-aliphatic resin and mixtures thereof.

3. The metallic fastener according to claim 2, wherein the resin consists of colophony or damar.

4. The metallic fastener according to claim 1, wherein the silica is fumed silica.

5. The metallic fastener according to claim 1, wherein the metallic fastener is selected from the group consisting of studs, screws, bolts, nuts and combinations thereof.

6. The metallic fastener according to claim 1, wherein the composition has a melting point of less than 170° C. as determined by DSC (ASTM D 3418).

7. The metallic fastener according to claim 1, wherein the composition has a melting point of 70° C. to 170° C. as determined by DSC (ASTM D 3418).

8. The metallic fastener according to claim 1, wherein a coating of the composition disposed at the at least part of the threaded portion has a thickness in the range of 4 to 30 μm.

9. A coating composition for the metallic fastener of claim 1, which has a melting point as determined by DSC (ASTM D3418) of at least 70° C., and wherein the components and their amounts meet the requirements of the U.S. Food and Drug Administration as set in 2015, and which essentially consists of:
- (a) a paraffin wax with a congealing temperature as determined by ASTM method D938-71 (reapproved 1981) in the range of 50 to 70° C., (b) 1 to 5 parts by weight (pbw) of a resin per weight of paraffin wax, (c) 0.1 to 0.25 pbw graphite being essentially elemental carbon per weight of paraffin wax, and (d) 0.05 to 0.30, preferably 0.08 to 0.25 pbw of a silica per weight of paraffin wax.

10. The composition according to claim 9, which has a dynamic viscosity at 50° C. of at least 1.0 Pa·s.

11. A process for preparing a metallic fastener comprising a threaded portion, comprising the following steps:
- (i) providing the metallic fastener and the composition as defined in claim 1,
- (ii) maintaining the metallic fastener or bringing it to a temperature in the range of 30 to 70° C.,
- (iii) applying the composition at a temperature in the range of 100 to 170° C.,
- (iv) optionally, removing surplus composition,
- (v) cooling the metallic fastener to less than 100° C.,
- (vi) finishing the metallic fastener in a water bath, and
- (vii) drying the metallic fastener.

12. The process according to claim 11, that is part of a manufacturing process of the metallic fastener.

13. The process according to claim 11, wherein the composition is heated to a temperature above that of the metallic fastener, preferably from 130 to 150° C.

14. The process according to claim 11, wherein the metallic fastener in step (v) is allowed to cool down to a temperature between 60 and 75° C.

15. The process according to claim 11, wherein the water bath in step (vi) is maintained at a temperature between 30 and 50° C.

16. A process for preparing a metallic fastener comprising a threaded portion, comprising the following steps:
- (i) providing the metallic fastener and the composition as defined in claim 1,
- (ii) producing a powder of said composition,
- (iii) electrodepositing the powdered composition to form a coating on the threaded parts of the metallic fastener,
- (iv) optionally, removing surplus composition,
- (v) melt-fusing the applied powdered composition at a temperature in the range of 100 to 200° C., and
- (vi) cooling the metallic fastener.

* * * * *